WILLIAM B. SLOAN.
Improvement in Blind-Slat Adjusters.
No. 127,376.  Patented May 28, 1872.
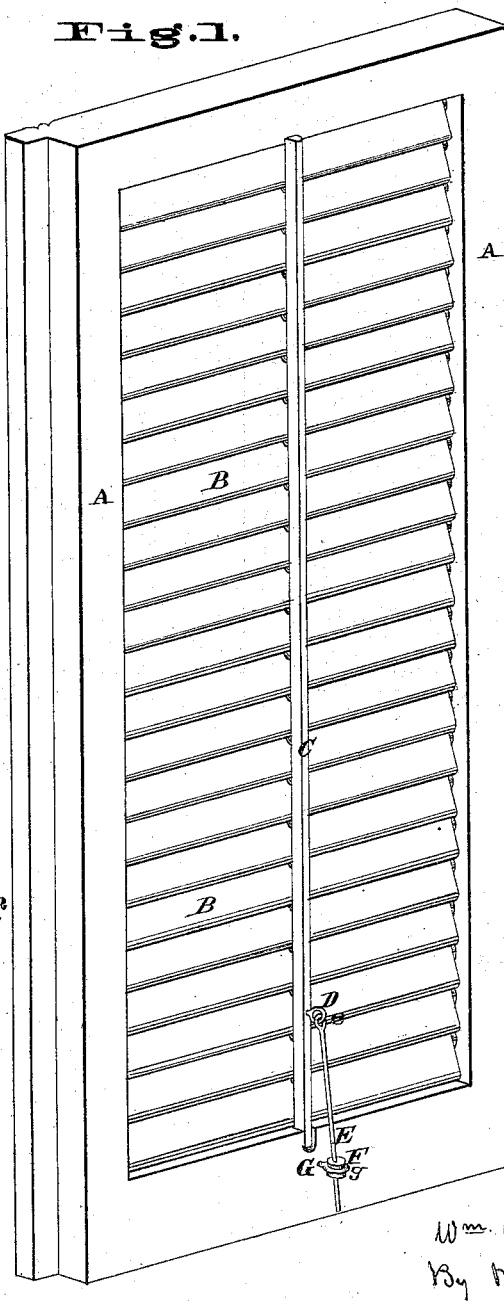
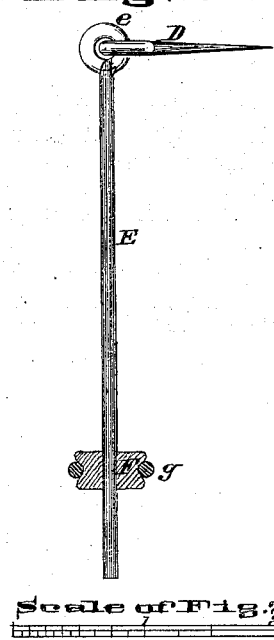

UNITED STATES PATENT OFFICE.

WILLIAM B. SLOAN, OF HAMBURG, IOWA.

IMPROVEMENT IN BLIND-SLAT ADJUSTERS.

Specification forming part of Letters Patent No. 127,376, dated May 28, 1872.

Specification describing a certain Blind-Slat Adjuster, invented by WILLIAM B. SLOAN, of Hamburg, in the county of Fremont and State of Iowa.

This invention relates to a device for holding blind-slats in any desired position; and consists substantially of a rod hinged to the connecting-rod of the slats and passing through a piece of India rubber or other suitable substance secured to the blind frame.

Figure 1 is a perspective view of a blind to which my device is applied. Fig. 2 is an elevation of my improvement, showing the friction-block in section.

A is the frame of the blind, and B the slats. C is a rod connecting the slats together. D is an eye-pin driven into the rod C; and E is a rod connected by an eye, $e$, to the eye D. The rod E passes through a piece or block, F, of India rubber inserted in the eye $g$ of a screw-eye, G, that is screwed into the frame. The friction-block F holds the rod E to any position in which it may be placed, and thus holds the slats to any desired adjustment.

Leather or any other suitable substance may be used for the friction-block in place of the India rubber, but the latter is the material I have used, and will, it is believed, give the best results.

The friction-rod E may be attached directly to one or more of the slats, but would not answer so good a purpose as when attached to the connecting-rod C, as described. The rod C may be of metal, and its end may pass through the friction-block F.

I claim as my invention—

The slat-adjuster, consisting of the rod E pivoted to either the slat or operating bar and passing through the elastic friction-block F inserted in screw-eye G, all constructed, arranged, and operating as and for the purpose set forth.

In testimony of which invention I have hereunto set my hand.

WILLIAM B. SLOAN.

Witnesses:
   E. SMALL,
   J. L. PARMAN.